United States Patent [19]

Sakai et al.

[11] 3,922,933
[45] Dec. 2, 1975

[54] CONTROLS FOR AUTOMATIC TRANSMISSIONS
[75] Inventors: Toshimitsu Sakai; Mitsuo Kawai, both of Toyota, Japan
[73] Assignee: Toyota Jidosha Kogyo Kabushiki Kaisha, Japan
[22] Filed: Feb. 25, 1974
[21] Appl. No.: 445,248

[30] Foreign Application Priority Data
Apr. 14, 1973 Japan.............................. 48-41832

[52] U.S. Cl..................... 74/866; 74/473 R; 74/336
[51] Int. Cl.²................. B60K 41/18; B60K 20/00; F16H 5/60
[58] Field of Search.......... 74/473 R, 866, 867, 868, 74/869, 336

[56] References Cited
UNITED STATES PATENTS
| | | | |
|---|---|---|---|
| 3,465,612 | 9/1969 | Letwin et al....................... | 74/473 R |
| 3,704,982 | 12/1972 | Hobbins............................. | 74/473 R |
| 3,724,293 | 4/1973 | Wakamatsu et al.................. | 74/866 |
| 3,726,157 | 4/1973 | Marumo............................ | 74/866 X |
| 3,727,488 | 4/1973 | Wakamatsu et al.................. | 74/866 |
| 3,776,048 | 12/1973 | Enomoto et al..................... | 74/866 |
| 3,813,964 | 6/1974 | Ichimura et al..................... | 74/866 |

Primary Examiner—Samuel Scott
Assistant Examiner—Lance W. Chandler
Attorney, Agent, or Firm—Toren, McGeady and Stanger

[57] ABSTRACT

Controls for automatic transmissions in which a manual valve for effecting change of the interconnections between the passages or lines through which pressure fluid is transmitted according to given shift ranges in a hydraulic control system is enabled by shift lever means to have only one overall change-over position when the system is to operate in the forward speed region. When the shift lever is in the forward speed region shifting is automatically accomplished by the actuation of shift valves in response to signals from an electric control system without requiring manual activation of the manual valve with the shift control being automatically carried out depending on the driving condition of the vehicle.

3 Claims, 7 Drawing Figures

CONTROLS FOR AUTOMATIC TRANSMISSIONS

BACKGROUND OF THE INVENTION

This invention relates to controls for electrically accomplishing part of the shift control pattern of automatic transmissions which utilize a hydraulic torque converter.

Conventional controls of this character for automatic transmissions comprise an electric control circuit which emits electric signals for shifting by electrically detecting and computing the vehicle speed, throttle opening, and shift range, and a hydraulic control circuit which controls the change-over of fluid passages or lines depending on the shift range chosen and actuates valves in response to the electric signals for shifting from the electric control circuit so as to engage the clutches and brakes suitably to choose a set of gearing suited for the driving condition of the vehicle. The ordinary controls usually have a shift lever manipulatable to Park, Reverse, and Neutral range positions and forward speed ranges, e.g., Drive, Drive-2, and Low ranges for a three-forward-speed type, or four ranges of Drive, Drive-3, -2, and -1 ranges, so that both automatic and manual shifting operations are made possible. In the case of the three-forward-speed design, the manual valve that controls the change-over of the fluid lines of the hydraulic control circuit depending on the shift range assumes any of six positions corresponding to the Park, Reverse, Neutral, Drive, Drive-2, and Low ranges. In the case of the four-forward-speed design, the manual valve assumes one more position in the forward speed region, i.e., a total of seven positions are provided for the valve.

To cover these positions the manual valve must have sufficient length and a consequently complicated structure, which in turn make it difficult to incorporate the valve in the valve body. A further disadvantage is that separate fluid lines must be provided to permit the manual valve to be shifted to the individual positions, thus complicating the hydraulic control circuitry.

SUMMARY OF THE INVENTION

The present invention is directed to the elimination of the foregoing disadvantages. According to the invention, when shifting to any of the transmission ranges by the manipulation of the shift lever, the manual valve controls the change-over of fluid passages by taking one of four positions, i.e., Park, Reverse, and Neutral ranges and an overall Drive range in the forward speed region, regardless of the number of shiftable ranges, e.g., three or four forward speed ranges, and the change-over control corresponding to the Drive-3, Drive-2, Low and the like ranges other than the Drive range in the forward speed region is accomplished by an electric control circuit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

2

DESCRIPTION OF THE PREFERRED EMBODIMENTS

Figure 1:
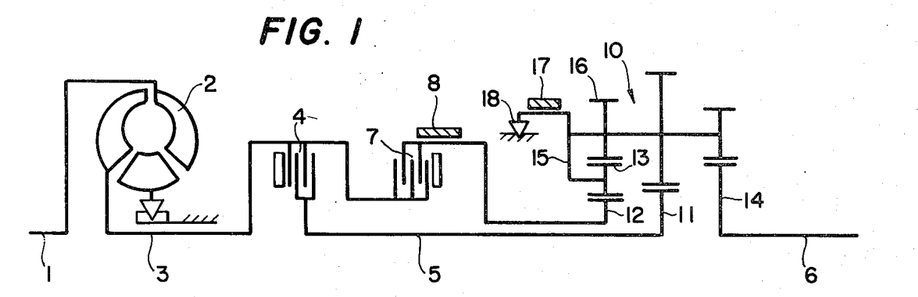
FIG. 1 is a schematic illustration of a three-forward-speed automatic transmission incorporating the present invention.

Referring now to the drawings, in which FIGS. 1 to 4 show an embodiment of the invention as applied to an automatic transmission of the three-forward-speed type, and specifically to FIG. 1, an engine crankshaft 1 is shown as connected to an output shaft 6 through a torque converter 2, an input shaft 3, a front clutch 4, an intermediate shaft 5, and a planetary gear unit 10, in the order mentioned, along a common axis. The drum side of the front clutch 4 is connected to the hub side of a rear clutch 7, the drum side of which is provided with a front brake band 8. The planetary gear unit 10 consists of a first sun gear 11 and a second sun gear 12 meshed, respectively, with the intermediate shaft 5 and rear clutch 7, a short pinion 13 in mesh with the second sun gear 12 and a long pinion 16 in mesh with the first sun gear 11, short pinion 13, and a gear 14 integral with the output shaft 6, the long pinion being rotatably journaled in a carrier 15. On the carrier 15 are provided a rear brake band 17 and a one-way clutch 18.

With the construction described above, the power delivered from the crankshaft 1 through the torque converter 2 to the input shaft 3 is thence transmitted to the intermediate shaft through the agency of the front clutch 4, thus establishing forward drive. In this state, the rear clutch 7, the front brake band 8, rear brake band 17, and oneway clutch 18 are selectively actuated to either restrain the rotation of or transmit power integrally to the carrier 15 and second sun gear 12 of the planetary gear unit 10, so that the output shaft 6 attains the first speed, second speed, and third speed in a directly coupled state. Power for reversed, reduced speed operation may be directed to the output shaft 6 by the engagement of the rear clutch 7 instead of the front clutch 4 for the transmission of power to the second sun gear 12 of the planetary gear unit 10 and by the actuation of the rear brake band 17 that restrains the rotation of the carrier 15.

The shifting functions of the above-mentioned components are tabulated in Table 1, wherein the reference numerals denote the clutches and brake bands which, when operative, are represented by circles.

Table 1

|  | 4 | 7 | 8 | 17 | 18 |
|---|---|---|---|---|---|
| 1st speed, w/engine brake | 0 |  |  | 0 |  |
| 1st speed | 0 |  |  |  | 0 |
| 2nd speed | 0 |  | 0 |  |  |
| 3rd speed | 0 | 0 |  |  |  |
| Reverse |  | 0 |  | 0 |  |

Figure 2:
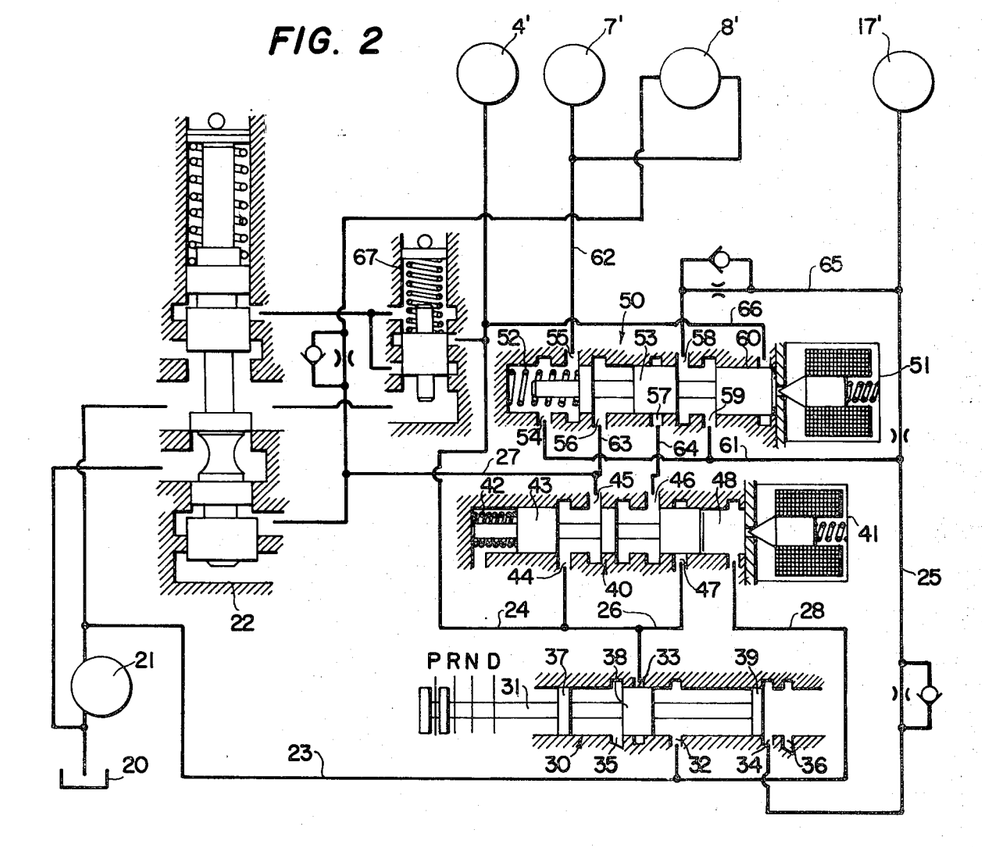
FIG. 2 is a circuit diagram of a typical hydraulic control circuit for the three-forward-speed automatic transmission.

FIG. 2 illustrates an exemplary hydraulic control circuit for selectively actuating such clutches 4, 7 and brake bands 8,17 depending upon the driving condition of the vehicle. Pressure fluid pumped up from an oil reservoir 20 by an oil pump 21 is set to a predetermined pressure level by a regulator valve 22, and is delivered through a line 23 to a manual valve 30. From the manual valve 30 the fluid flows through a first-to-second shift valve 40 equipped with a solenoid valve 41 and through a second-to-third shift valve 50 with a solenoid valve 51, and then is supplied or drained in hydraulic servo mechanisms 4', 7', 8', 17' which in turn operate the clutches 4, 7 and brake bands 8, 17. The manual valve 30 comprises: a spool 31, which is mechanically interlocked with shift lever means to be described later and adapted to assume any of four positions by corresponding movement to the Park, Reverse, Neutral, and Drive ranges; a port 32 communicating with a fluid line 23; a port 33 for the forward drive; a port 34 for the reverse drive; drain ports 35,36; and three lands 37 to 39 provided on the spool 31 to establish communication between the port 32 and either of the ports 33 and 34, communicating the remaining port with the drain ports 35,36. The port 33 is communicated with the hydraulic servo 4' through a line 24, and the port 34 with the servo 17' through a line 25. The first-to-second shift valve 40 consists of a spool 43 loaded with a spring 42 at one end and a fluid chamber 48 which is supplied with fluid and drained through four ports 44 to 47 and by means of the solenoid valve 41. The ports 44,47 communicate with the line 24 and a line 26 branched therefrom, the port 45 with the supply side of the hydraulic servo 8' via a line 27, and the fluid chamber 48 with the line 23 via a line 28.

The second-to-third shift valve 50 consists of a spool 53 loaded with a spring 52 at one end, and a hydraulic fluid chamber 60 which is supplied with fluid and drained through six ports 54 to 59, and by means of the solenoid valve 51. The ports 54,59 are communicated with the line 25 via a line 61; the port 55 with the hydraulic servo 7' and the release side of the servo 8' via a line 62; the ports 56,57 with the ports 45,46 of the valve 40 via lines 63,64; the port 58 with the line 25 via a line 65; and the fluid chamber 60 with the line 24 via a line 66. Between the regulator valve 22 and line 24 is interposed a relay valve 67, which maintains the hydraulic fluid pressure during the forward drive except first speed at a level lower than during the reverse drive and first speed forward drive so as to reduce the shock of shifting. Desirably the fluid lines are provided with orifices and check valves at convenient points.

Thus, when the manual valve 30 is in the Park range position, its ports 32, 33, 34 are closed by its lands 38, 39, and in the Neutral range position, the port 32 is closed by the land 38 and all the hydraulic servos 4', 7', 8', 17' are exhausted regardless of any electric signals from the solenoid valves 41,51. In the reverse position, the manual valve 30 has its ports 32,34 communicated by the lands 38, 39 so that the fluid pressure from the line 23 is supplied to the hydraulic servo 17' via the line 25. At this point the fluid chamber 60 of the second-to-third shift valve 50 is exhausted irrespective of electric signals from the solenoid valve 51 and the spool 53 is moved to the right thereby establishing communication between the ports 54 and 55. As a result, the pressure from the line 25 is delivered as the servo 7' by way of the line 62 to actuate the clutch 7 and brake band 17 for reverse operation. With the manual valve in the Drive position, its lands 37, 38 establish communication between its ports 32 and 33 to permit the pressure from the line 23 to be supplied to the servo 4' through the line 24 and cause the clutch 4 to be engaged for forward operation. In this stage both solenoid valves 41,51 are energized and the spools 43,53 are moved to the right by exhausting the fluid chambers 48,60 of the shift valves 40,50. Accordingly, the ports 44, 57 are closed and the other servos 7', 8', 17' are exhausted to provide the first speed. If, at this time, only the solenoid valve 41 is de-energized to generate a fluid pressure in the fluid chamber 48 and thereby move the spool 43 of the first-to-second shift valve 40 to the left, thus establishing communication between the ports 44 and 45, then the pressure from the line 26 is directed to the servo 8' through the line 27, and the front brake band 8 is activated to provide the second speed. If the solenoid valve 51 is de-energized, too, so as to generate a fluid pressure in the fluid chamber 60 and move the spool 53 of the second-to-third shift valve 50 to the left thereby establishing communication between the ports 55 and 56, the pressure from the line 63 is supplied to the release side of the servo 8' as well as to the servo 7' through the line 62. As a consequence, the brake band 8 is released and the clutch 7 is engaged to provide the third speed. Now if the solenoid valve 41 is energized and the solenoid valve 51 is de-energized, communication is established between the ports 46 and 47 of the first-to-second shift valve 40 and between the ports 57 and 58 of the second-to-third shift valve 50. This enables the pressure from the line 24 to be supplied to the hydraulic servo 17' via the lines 26, 64, 65, 25 and activates the rear brake band 17 to provide the first speed with the capability of engine braking.

The above-described relationships between the shift ranges and the functioning of the solenoid valves 41, 51, i.e., which one is energized and which not, are tabulated in Table 2. The numerals indicate the solenoid valves, which are in the energized state when represented by 0 and de-energized when represented by X.

Table 2

|  | 41 | 51 |
|---|---|---|
| Park range | X | X |
| Reverse range | X | X |
| Neutral range | X | X |
| Drive range |  |  |
| 1st speed | 0 | 0 |
| 2nd speed | X | 0 |
| 3rd speed | X | X |
| 1st speed w/engine brake | 0 | X |

As will be clear from the foregoing, the manual valve 30 in the forward drive region operates only in the Drive range and retains its Drive range status in other forward ranges, as well.

Figure 3:
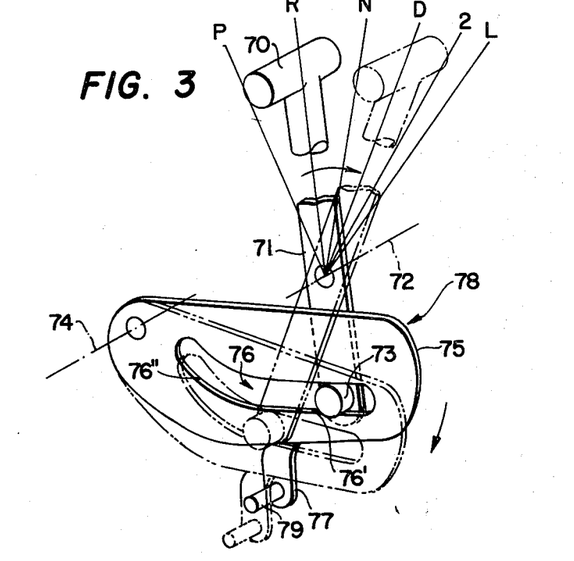
FIG. 3 is a perspective view of a typical shift lever assembly according to the invention.

FIG. 3 illustrates a shift lever device 78 that permits the relative movements of the manual valve just described above. In FIG. 3, a shift lever 71 provided with a knob 70 at its top is swingably supported at an intermediate point by a pivot 72. The lever carries a guide 73 at its lower end. The guide is slidably engaged with a slot 76 of a shiftrange limiting member 75 which is also swingably supported by another pivot 74 held in parallel with the pivot 72. The limiting member 75 is connected to the lever 79 of the manual valve 30 through a linkage, not shown, and a connector 77 located slightly away from the pivot 74, so that, depending on the swing of the shift lever 71, the member 75 is turned to actuate the manual valve 30. The slot 76 consists of a straight portion 76' and an arcuate or upwardly curved portion 76" which operates to prevent a part of the swing of the shift lever 71 from being transmitted to the member 75.

Thus, as the shift lever 71 is moved for shifting to the Park, Reverse, Neutral, Drive, Drive 2, or L range, the guide 73 is swung contrariwise. In the P, R, N or D range, the guide 73 is associated with the straight portion of the slot 76 and, while sliding a little in the slot, causes the shiftrange limiting member 75 to turn about the pivot 74, thus enabling the manual valve 30 to work according to the chosen range. When shifting to the Drive-2 or Low range as indicated by the alternate long and short dash lines, the guide 73 slides away from the straight portion 76' into engagement with the arcuate portion 76" of the slot 76. The guide 73 which now swings together with the shift lever 71 is free to slide in the slot without applying a pressure any longer against the member 75. Therefore, the manual valve 30 maintains the Drive range position with the member 75 kept stationary.

Figure 4:
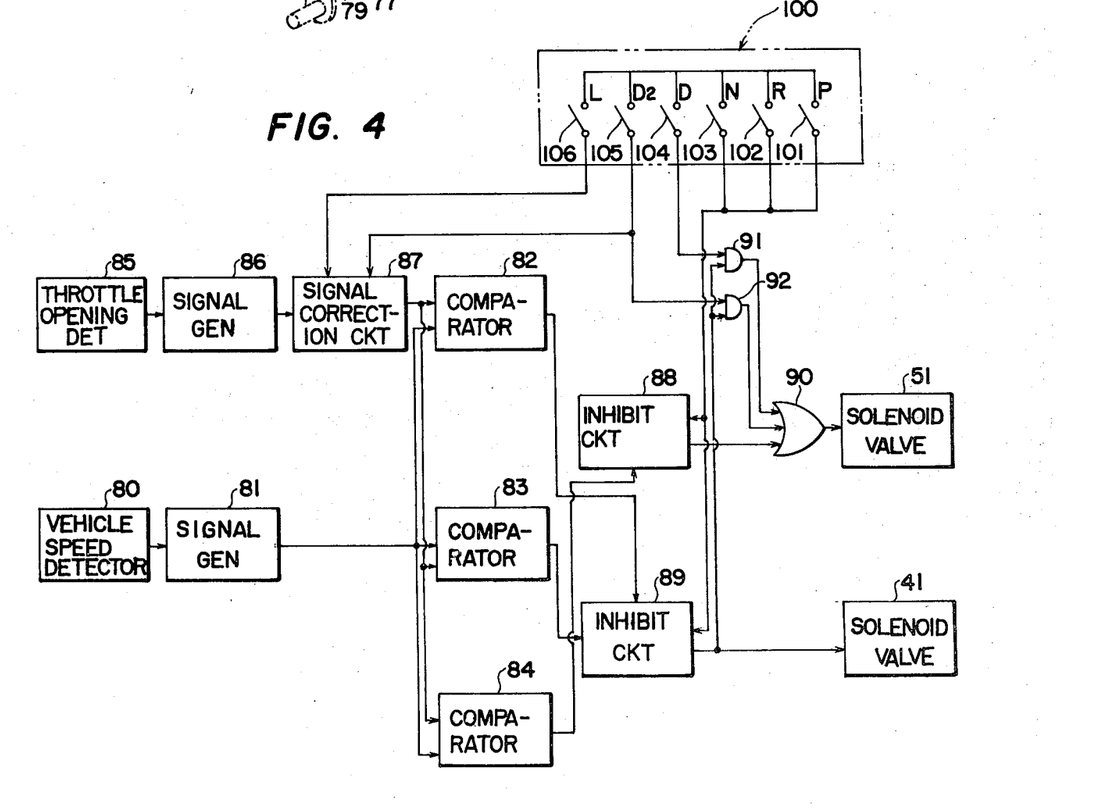
FIG. 4 is a circuit diagram of a typical electric control circuit for the three-forward-speed automatic transmission.

FIG. 4 illustrates an example of the electric control circuitry for energizing or de-energizing the solenoid valves 41, 51 according to the ranges and shift positions. A vehicle speed detector 80 of a known type is connected to three comparators 82 to 84 through a signal generator 81 which converts a given number of pulses into an analog amount. A throttle opening detector 85 of a known type which detects the throttle opening corresponding to the engine load is likewise connected to the comparators 82 to 84 via a signal generator 86 which generates signals as converted to voltages and a signal correction circuit 87. In response to the input of a signal from a shift range setter 100, the signal correction circuit 87 gives weight to the throttle opening signal to change its reference level relative to the vehicle speed signal. The three comparators 82 to 84 compare the vehicle speed signal and throttle opening signal and, depending on the relationship between the two, they function in the following way. When both signals pertain to the first speed range, only the comparator 83 emits a signal 1; in the second speed range, the two comparators 82, 83 emit a signal 1; and in the third speed range, the three comparators 82 to 84 emit a signal 1. Of these comparators 82 to 84, the first one 82 is connected to the solenoid valve 51 on the side of the second-to-third shift valve through an inhibit circuit 88 and an OR circuit 90; the comparator 83 is connected to the solenoid valve 41 on the side of the first-to-second shift valve through another inhibit circuit 89; the comparator 82 being also connected to the other inhibiting side of the inhibit circuit 89; and the comparator 84 is connected to the other inhibiting side of the inhibit circuit 88. The shift range setter 100 has six switches 101 to 106 which are turned ON or OFF corresponding to the Park, Reverse, Neutral, Drive, Drive-2, and Low ranges. Of these switches, switches 101 and 103 for the P, R and N ranges are connected together to the other inhibiting sides of the two inhibit circuits 88 to 89; the switch 104 for the Drive range is connected to the input side of an AND circuit 91; the switch 105 for the Drive-2 range to the signal correction circuit 87 and the input side of another AND circuit 92; and the switch 106 for the low range to the signal correction circuit 87. These AND circuits 91, 92 have the other input sides connected to the output side of the inhibit circuit 89, and their output sides are connected to the input side of the OR circuit 90.

In the case of shifting to the Park, Reverse or Neutral range, one of the switches 101 to 103 of the shift range setter 100 is turned ON to actuate the inhibit circuits 88, 89, with the consequence that the output of the inhibit circuit 89 is reduced to zero and the solenoid valve 41 is de-energized. In the absence of the output from the inhibit circuit 89, no outputs will be emitted from the AND circuits 91,92 either. Because of no output from the inhibit circuit 88 due to its inhibiting action, the output of the OR circuit 90 becomes zero and the solenoid valve 51 is de-energized. In the case of the Drive range, the switch 104 of the shift range setter 100 is turned ON and a signal 1 is applied as input to one side of the AND circuit 91. In the first speed range, a signal 1 is emitted as output from the comparator 83 and is transmitted to the solenoid valve side without being inhibited by the inhibit circuit 89, so that the solenoid valve 41 is energized. At this time, a signal 1 from the inhibit circuit 89 is applied as input to the AND circuit 91 and, together with the output from the AND circuit 91, an output signal is emitted from the OR circuit 90 thereby to also energize the solenoid valve 51. In the second speed range, the comparator 82 emits a signal 1 as does the comparator 83 thereby causing the inhibit circuit 89 to function so as to de-energize the solenoid valve 41. Without inhibition by the inhibit circuit 88, the signal from the comparator 82 is applied as input to the OR circuit 90, and therefore an output signal is emitted also from the same circuit 90 to energize the solenoid valve 51. In the third speed range, signals 1 are emitted from all of the three comparators 82 to 84 to cause both inhibit circuits 88,89 to act and de-energize the solenoid valve 41. With no input to or output from the AND circuits 91, 92 and OR circuit 90, the solenoid valve 51 is de-energized. In the Drive-2 range, the switch 105 of the shift range setter 100 is turned ON and a signal 1 is applied as input to one side of the AND circuit 92 and also a signal is applied as input to the signal correction circuit 87. Consequently, the throttle opening signal is corrected and the shift pattern with the comparators 82 and 84 is made different from that in the Drive range; that is, in the first speed the comparator 83 alone emits a signal 1 and in the second and further speeds the comparators 82 and 83 emit signals 1. Thus, in the first speed, the output signal from the comparator 83 energizes the solenoid valve 41 and the OR circuit 90 emits a signal as does the AND circuit 92 to also energize the solenoid valve 51. In the shift ranges for the second and further speeds, the comparators 82,83 emit signals 1 and de-energize the solenoid valve 41 in the same way as in the Drive range. In the case of the Low range, the switch 106 of the shift range setter 100 is turned on to apply an input signal to the signal correction circuit 87. Therefore, the shift pattern with the comparators 82 to 84 is again made different from that of the Drive range and the comparator 83 alone always emits a signal 1 irrespective of the shift position. This output signal energizes the solenoid valve 41, and the output signal from the OR circuit is made zero as is the output signal from the AND circuits 91,92 whereby the solenoid valve 51 is de-energized.

In the electric control circuitry above described, the signal correction circuit may be designed to correct either the vehicle speed signal alone or both the throttle opening signal and vehicle speed signal. In the manner described, the solenoid valves 41,51 can be energized or de-energized according to the individual range positions as tabulated in Table 2. The functioning of those valves, and their overall control in the forward speed region, is divided so that in the Drive range, the first to third speeds are attained, in the Drive 2 range the first and second speeds are attained, and in the Low range the first speed with engine braking is attained.

Figure 5:
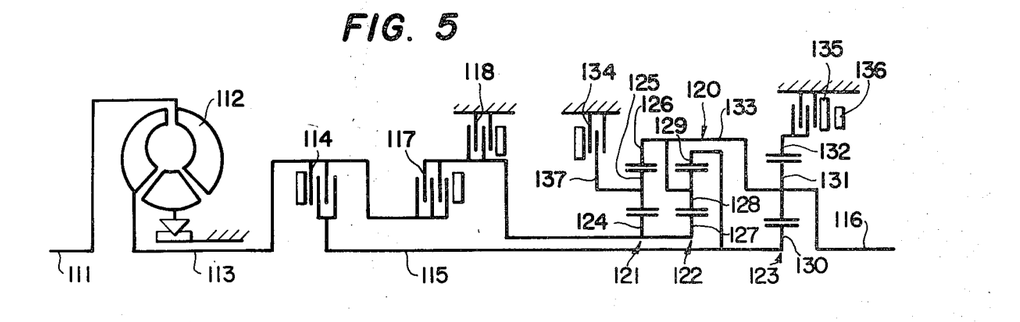
FIG. 5 is a schematic illustration of a four-forward-speed automatic transmission incorporating the present invention.
Figure 6:
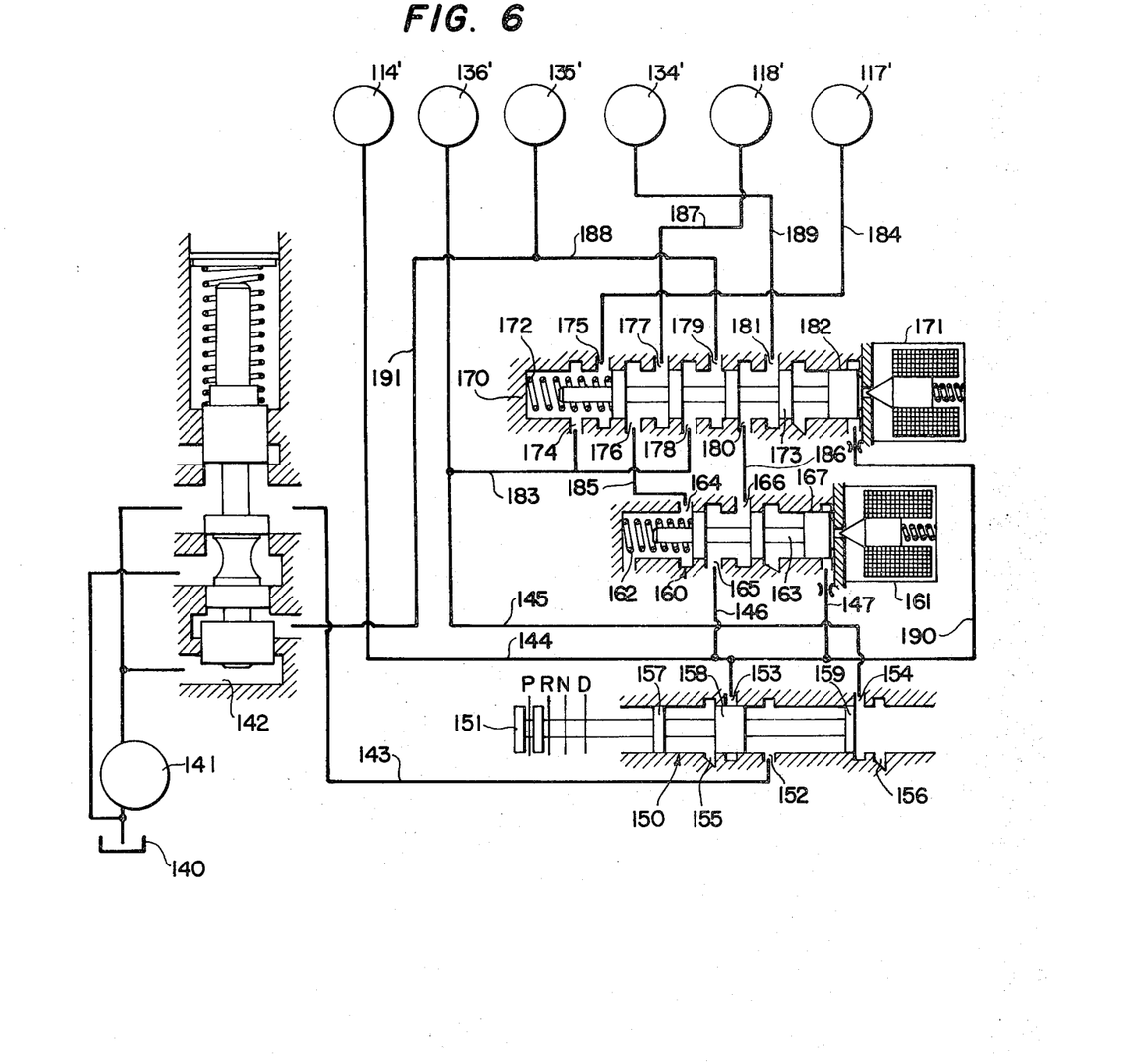
FIG. 6 is a circuit diagram of a typical hydraulic control circuit for the four-forward-speed automatic transmission.
Figure 7:
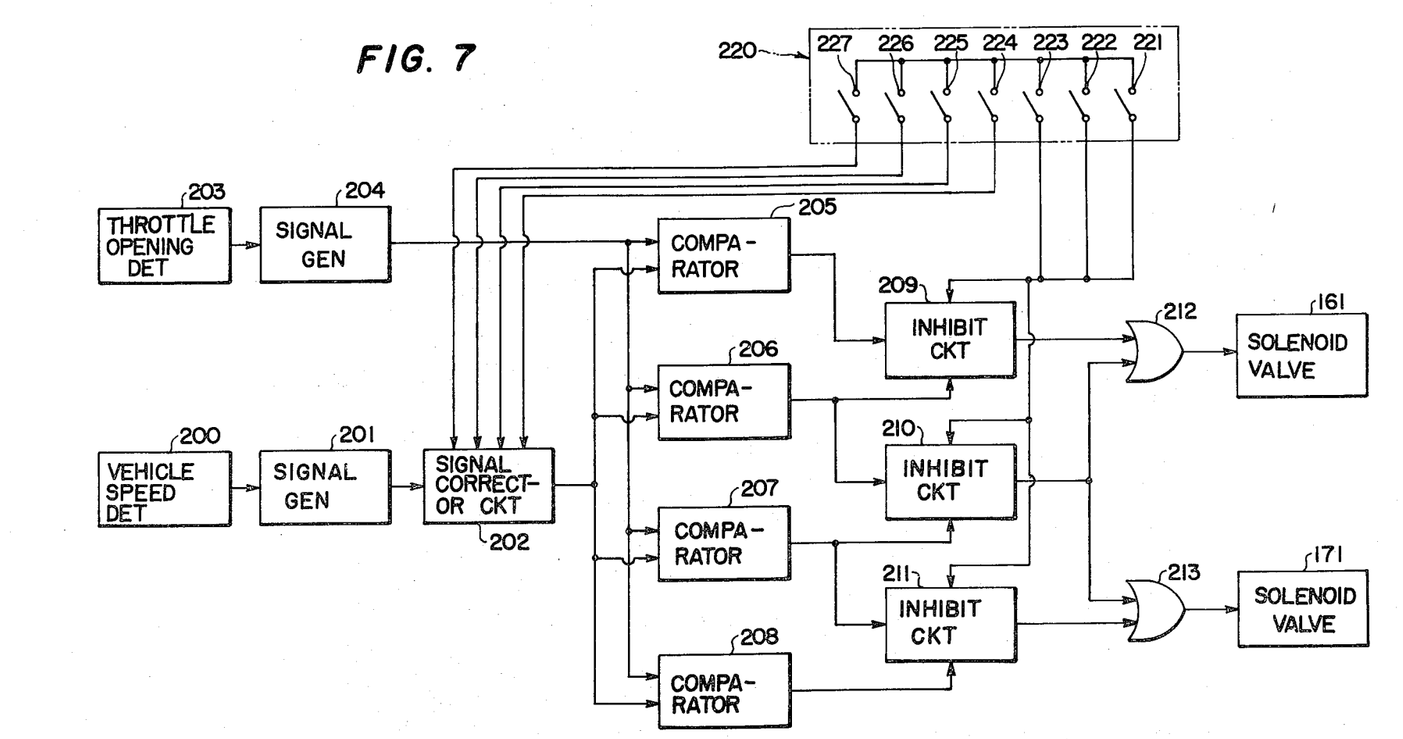
FIG. 7 is a circuit diagram of a typical electric control circuit for the four-forward-speed automatic transmission.

FIGS. 5 to 7 show an automatic transmission of the four-forward-speed type which embodies the present invention. Referring specifically to FIG. 5, an engine crankshaft 111 is connected to an output shaft 116 through a torque converter 112, an input shaft 113, a front clutch 114, an intermediate shaft 115, and a gear unit 120, in the other mentioned. The drum side of the front clutch is connected to the hub side of a rear clutch 117, the drum of which is provided with a third brake 118. The gear unit 120 has two sets of single planetary gears 121, 122 combined together in a Simpson fashion, and a set comprising single planetary gear 123. A ring gear 129 and a sun gear 130 for the planetary gears 122 and 123 are connected to the intermediate shaft 115, and sun gears 124 and 127 for the planetary gears 121 and 122 are connected to the rear clutch 117. A ring gear 126 for the planetary gear 121 is fixed to a carrier 133, and pinions 128 and 131 for the planetary gears 122 and 123 are journaled in the carrier 133, which in turn is fixedly mounted on the output shaft 116. A carrier 137, in which a pinion 125 for the planetary gear 121 is provided, is engaged with a second brake 134. A ring gear 132 for the planetary gear 132 is provided with a first brake 135 and a reverse brake 136 which have a brake plate in common but use different brake pistons.

With the construction described above, the power delivered from the crankshaft 111 through the torque converter 112 to the input shaft 113 is thence transmitted to the intermediate shaft 115 through the engagement of the front clutch 114, thus establishing the forward drive. At this point, the first brake 135 is actuated to restrain the rotation of the ring gear 132, the second brake 134 is actuated to restrain the rotation of the ring gear 132, the second brake 134 is actuated to restrain the rotation of the pinion 125, the third brake 118 is actuated to restrain the rotation of the sun gears 124,127, and the rear clutch 117 is engaged to apply input power to the sun gears 124, 127, so that the output shaft 116 can attain the first, second, third, and fourth speeds always with the capability of engine braking. Also, by engaging the rear clutch 117 instead of the front clutch 114 and actuating the reverse brake 136 together with the first brake 135 to restrain the rotation of the ring gear 132, a reverse speed can be attained on the output shaft 6.

The shifting operations for the four-forward-speed arrangement above described are tabulated, in the manner as with Table 1, in Table 3.

Table 3

| | 114 | 117 | 135 | 134 | 118 | 136 |
|---|---|---|---|---|---|---|
| 1st speed | 0 | | 0 | | | |
| 2nd speed | 0 | | | 0 | | |
| 3rd speed | 0 | | | | 0 | |
| 4th speed | 0 | 0 | | | | |
| Reverse | | 0 | 0 | | | 0 |

FIG. 6 shows a typical hydraulic control circuit for selectively actuating the clutches 114, 117 and brakes 118, 134 to 136 of such an automatic transmission. In the same way as in FIG. 2, the circuit includes a manual valve 150 which is communicated with a hydraulic fluid reservoir 140 via an oil pump 141, a regulator valve 142, and a line 143. The manual valve 150 is itself made up a spool 151 that is enabled to assume any of four positions by a shift lever device constructed in the same manner as illustrated in FIG. 3, ports 152 to 154, drain ports 155, 156, and three lands 157 to 159. Pressure fluid is supplied to the manual valve equipped with a solenoid valve 161 and through a second-to-third shift valve 170 with a solenoid valve 171, supplied or drained to hydraulic servos 114', 117', 118', 134' to 136' which in turn operate the clutches 114, 117 and brakes 118, 134 and 136. The port 153 for the forward drive of the manual valve 150 communicates with the hydraulic servo 114' via the line 144, and the port 154 for the reverse drive communicates with the servo 136' via the line 145. The first-to-second shift valve 160 consists of a spool 163 which is loaded with a spring 162 at one end, and a hydraulic fluid chamber 167 which is supplied with hydraulic fluid or is drained through three ports 164 to 166 and by means of the solenoid valve 161. The port 165 is communicated with a line 146 branched from the line 144, and the fluid chamber 167 is communicated with a line 147 branched from the line 144. The second-to-third shift valve 170 consists of a spool 173 loaded with a spring 172 at one end, and a hydraulic fluid chamber 182 which is supplied with fluid and drained through eight ports 174 to 181 and by means of the solenoid valve 171. The ports 174 and 178 are communicated with a line 183 branched from the line 145; the port 175 with the hydraulic servo 117' via a line 184; the ports 176, 180 with the ports 164, 166 of the first-to-second shift valve 160, respectively, via lines 185, 187; the port 177 with the hydraulic servo 118' via a line 187; the port 179 with the hydraulic servo 134' via a line 189; and the hydraulic fluid chamber 182 with the line 147 via a line 190. These fluid lines are provided with orifices where desirable. The line 188 and the supply side of the regulator valve 142 are communicated by a line 191 so that the hydraulic fluid pressure is increased for the first speed operation or reversing.

With the arrangement described above, the manual valve 150 when shifted to the Park, Reverse, Neutral, or Drive range, functions in entirely the same manner as in the arrangement of FIG. 2. When the shifting to the Park or Neutral range, the ports 152 to 154 are closed or kept out of communication so as to exhaust all the hydraulic servos 114', 117', 118', 134' to 136'. In the case of the Reverse range, communication is established between the ports 152 and 154 of the manual valve 150 to permit the supply of the fluid pressure from the line 143 to the hydraulic servo 136' through the line 145. At this point, the fluid chamber 182 of the second-to-third shift valve 170 is exhausted and the spool 173 is moved to the right, with the result that the ports 174, 175 and 178, 179 are communicated and the fluid pressure from the line 145 is supplied to the hydraulic servo 117' through the lines 183, 184 and also to the servo 135' through the line 188. The clutch 117 and brakes 135, 136 are thus actuated to provide the reverse drive. Next, in the Drive range, communication is established between ports 152 and 153 to permit the pressure from the line 143 to be supplied to the servo 114' through the lid 144 and cause the clutch 114 to be engaged for forward operation. In this stage the solenoid valve 161 is energized and the ports 165 and 166 of the first-to-second shift valve 160 are communicated by rightward movement of the spool 163, whereas the solenoid valve 171 is de-energized and, in the second-to-third shift valve 170, the pressure from the hydraulic fluid chamber 182 moves the spool 173 to the left, thus providing communication between the ports 179 and 180. The fluid pressure from the line 146 is then supplied to the hydraulic servo 135' via the lines 186, 188, and the first brake 135 is actuated to provide the first speed. If, at this time, the solenoid valve 171 is energized and the spool 173 of the second-to-third shift valve 170 is moved to the right, then the port 180 is commuicated with the port 181 and the pressure from the line 186 is supplied to the hydraulic servo 134' via the line 189, so that the second brake 134 is actuated to provide the second speed. If the solenoid valve 161 is de-energized and the spool 163 in the first-to-second shift valve 160 is moved to the left by the pressure from the fluid chamber 167, communication is then established between the ports 164 and 165. If, at this point, the solenoid valve 171 is energized and the ports 176 and 177 of the second-to-third shift valve 170 are communicated, the pressure from the line 146 is supplied to the servo 118' through the lines 185, 187, and the third brake 118 is actuated to provide the third speed. Further, if the solenoid valve 171 is de-energized, too, and the ports 176 and 175 of the second-to-third shift valve 170 are communicated, the pressure from the line 185 is supplied to the servo 117' through the line 184 to actuate the rear clutch 117 and provide the fourth speed.

The above-described relationships between the shift ranges and the functioning of the solenoid valves 161, 171, i.e., which one is energized and which not in what event, are tabulated, in the same manner as with Table 2, in Table 4.

Table 4

|  | 161 | 171 |
|---|---|---|
| Park range | X | X |
| Reverse range | X | X |
| Neutral range | X | X |
| Drive range |  |  |
| 1st speed | O | X |
| 2nd speed | O | O |
| 3rd speed | X | O |
| 4th speed | X | X |

FIG. 7 illustrates an example of the electric control circuitry for energizing or de-energizing the two solenoid valves 161, 171. In the same way as with the arrangement shown in FIG. 4, a vehicle speed detector 200 is connected through a signal generator 201 to a signal correction circuit 202. A throttle opening detector 203 is connected to a signal generator 204. The signal correction circuit 202 and signal generator 204 in this arrangement are connected to four comparators 205 to 208, so that a signal 1 is emitted as an output from the comparator 205 alone when in the first speed range, or signals 1 are emitted as outputs from the comparators 205 and 206 when in the second speed range, or from the comparators 205 to 207 when in the third speed range, or from all the comparators 205 to 208 when in the fourth speed range. Of these comparators, 205 and 207 are connected to the solenoid valves 161, 171, respectively, through inhibit circuits 209, 211 and OR circuits 212, 213; the comparator 206 is connected to both OR circuits 212, 213 through an inhibit circuit 210; and the comparators 206 and 208 are connected to the inhibiting sides of the inhibit circuits 209 to 211. A shift range setter 220 has seven switches 221 to 227 which are turned ON or OFF according to the individual range positions of P, R, N. D, 3, 2 and 1. Of those switches, 221 to 223 are connected to the inhibiting sides of the inhibit circuits 209 to 211, and the switches 224 to 227 are connected to the signal correction circuit 202.

Thus, in the case of Park, Reverse, or Neutral range, the inhibit circuits 209 to 211 act to make the input signals to the OR circuits 212, 213 zero, with the result that the solenoid valves 161, 171 are de-energized. In the case of the Drive range, the switch 224 turns ON and the signal correction circuit 202 determines the shift pattern. In the first speed range, the OR circuit 212 outputs a signal, upon the receipt of a signal from the comparator 205, to energize the solenoid valve 161. In the second speed range, a signal from the comparator 206 causes the inhibit circuit 209 to function thereby to reduce the output to zero, but, because the signal is applied as input to both OR circuits 212, 213 to enable them to emit output signals, the solenoid valves 161, 171 are both energized. In the third speed range, a signal from the comparator 207 allows the inhibit circuit 210 to function and reduce its output signal to zero. Therefore the solenoid valve 161 is de-energized. A signal from the comparator 207 is applied as input to the OR circuit 213 so that an output signal is generated and the solenoid valve 171 is energized. In the fourth speed range, a signal from the comparator 208 causes the inhibit circuit 211 to function and reduce its output signal to zero, and therefore the solenoid valve 171 is also de-energized. Next, in the case of the Drive-3 range, the switch 225 is turned ON and the signal correction circuit 202 interrupts shifting to the fourth speed range, and, in the first, second, and third speed ranges, the solenoid valves 161, 171 are energized and de-energized in the same manner as above described. In the case of the Drive-2 range, the switch 226 is turned ON and the signal correction circuit 202 interrupts shifting to the third and fourth speed ranges to have the solenoid valves energized or de-energized in the same way as in the first and second ranges. In the Drive-1 range, the switch 227 is turned ON and any shifting to the second or further speed range is interrupted by the signal correction circuto 202 to have the valves energized or de-energized in the same way as in the first speed range alone.

In the manner described, the solenoid valves 161, 171 are energized and de-energized according to the applicable ranges as given in Table 4. Moreover, the shift means in the forward speed region are so arranged as to carry out given shifting actions in the individual ranges of Drive, Drive 3, Drive-2, and Drive-1. In the same way as in the first embodiment, the signal correction circuit 202 in this embodiment has functions which are not limited to the correction of vehicle speed signals or throttle opening signals.

As described hereinabove, the controls according to the present invention control the shifting in the forward speed region of automatic transmissions equipped with a torque converter by means of an electric control system. The controls, therefore, have simplified hydraulic circuitry as compared with the conventional controls which have an electric control circuit but depend upon a hydraulic control system for such control functions. Accordingly, under the invention, the designing and construction of the valve body are made easy and the manual valve may be descreased in length. These advantages are all the more pronounced with an increase in the number of shiftable speed ranges, for example, from the three forward speeds as in the first embodiment to the four forward speeds in the second embodiment just described above. In the latter case there is no need of modifying the construction of the manual valve. This settles the knotty design problem which would otherwise arise from a long manual valve which necessitates the means for sliding the valve in the valve body according to selected ranges to have enough space to move clear of the surrounding wall of the transmission case. The working stroke of the manual valve itself is shortened and the shift control is simplified with increased reliability and durability.

While specific embodiments of the invention have been shown and described in detail to illustrate the application of the inventive principles, it will be understood that the invention may be embodied otherwise without departing from such principles.

What is claimed is:

1. A control system for an automotive vehicle with an automatic transmission having shiftable gear means for effecting a plurality of transmission gear ratios including a forward drive range consisting of a plurality of different forward drive gear ratios, and a hydraulic control circuit including a plurality of hydraulic servo mechanisms for shifting said gear means, said control system comprising:

a manually operable valve for controlling the flow of hydraulic fluid within said hydraulic circuit, said manually operable valve being structured to effect a position for each of said transmission gear ratios other than said forward drive range gear ratios, and one position only for all of said forward drive gear ratios;

manual shift lever means movable to a plurality of shift range control positions including at least one position for each of said plurality of transmission gear ratios to be effected by said transmission including each of said forward drive range gear ratios;

means interconnecting said manual shift lever means with said manually operable valve to effect actuation of said valve by said shift lever means only in said one forward drive range position and in all positions other than forward drive range positions, said interconnecting means being structured to permit movement of said shift lever means to all of said forward drive range positions without displacing said manually operable valve from said one forward drive range position;

shift valves for supplying fluid pressure to and exhausting fluid pressure from said hydraulic servo mechanisms to control said transmission gear ratios;

an electric control circuit including signal generating means responsive to the operating conditions of said vehicle for generating electrical signals representative of said operating conditions;

logic circuit means responsive to said signal generating means for emitting electrical signals corresponding to the shift ranges of said transmission upon receipt of signals from said signal generating means; and drive means operative in response to receipt of signals from said logic circuit means to control operation of said shift valves;

said electrical circuit operating to effect shifting of said transmission gear ratios in accordance with the operating conditions of said vehicle for all of said gear ratios of said forward drive range in accordance with the position of said manual shift lever means when said shift lever means is in any of said forward drive range positions.

2. A control system, according to claim 1, wherein said manual shift lever means comprises a shift lever movable by manual operation to said plurality of shift range control positions, and a shift range limiting member connected for actuation by said shift lever to control said manually operable valve in dependence upon the positions of said shift lever, said shift range limiting member and said shift lever being interconnected to effect manual actuation of said manually operable valve in one forward drive range only.

3. A control system, according to claim 2, wherein said shift lever includes a first and a second end with a pivotal connection intermediate said ends mounting said shift lever for pivotal motion thereabout, one of said ends being positioned to be manually pivotally displaced, and wherein said shift range limiting member comprises a pivotally mounted slotted member arranged to be actuated by engagement with the opposite end of said shift lever, said slotted member having defined therein an elongated slot engaging said opposite end of said shift lever, said slot being configured in such a manner that actuation of said shift range limiting member by said shift lever is permitted to one only of said forward drive range positions.

* * * * *